(12) United States Patent
Murayama et al.

(10) Patent No.: US 6,226,175 B1
(45) Date of Patent: May 1, 2001

(54) HANDHELD ELECTRONIC DEVICE HAVING A STRESS RELEASING STRUCTURE AND METHOD FOR RELEASING STRESS IMPOSED THERETO

(75) Inventors: Tomomi Murayama; Teruo Kinoshita, both of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/313,771

(22) Filed: May 18, 1999

(30) Foreign Application Priority Data

May 18, 1998 (JP) ................................. 10-135142
May 18, 1998 (JP) ................................. 10-135143

(51) Int. Cl.[7] .......................................... H05K 7/02
(52) U.S. Cl. ................... 361/680; 361/681; 345/168; 235/145
(58) Field of Search .................. 361/680–682; 341/22; 345/168–172; 235/145

(56) References Cited

U.S. PATENT DOCUMENTS

| | | | |
|---|---|---|---|
| 5,335,145 | 8/1994 | Kusui | 361/737 |
| 5,355,278 * | 10/1994 | Hosoi et al. | 361/680 |
| 5,541,452 | 7/1996 | Onoda et al. | 361/737 |
| 5,712,766 | 1/1998 | Feldman | 361/801 |
| 5,859,475 * | 1/1999 | Freyman et al. | 257/738 |
| 5,966,284 * | 10/1999 | Youn et al. | 361/680 |
| 6,081,207 * | 1/2000 | Batio | 361/680 |

FOREIGN PATENT DOCUMENTS

| | | |
|---|---|---|
| 2-113362 | 9/1990 | (JP) . |
| 5-131788 | 5/1993 | (JP) . |
| 9-265857 | 10/1997 | (JP) . |

* cited by examiner

Primary Examiner—Leo P. Picard
Assistant Examiner—Hung Van Duong
(74) Attorney, Agent, or Firm—Oblon, Spivak, McClelland, Maier & Neustadt, P.C.

(57) ABSTRACT

An apparatus and method for releasing a load stress imposed during operation of a handheld electronic device includes a thin housing body defining an opening for mounting a keyboard panel. The keyboard panel has a relatively low rigidity. A spacing structure is provided to maintain a predetermined distance between a surface of a semiconductor package mounted on the keyboard panel and the thin housing body. The height of the spacing structure is greater than the height of the semiconductor package so that the predetermined distance is maintained when the keyboard panel is elastically deflected.

21 Claims, 10 Drawing Sheets

HANDHELD ELECTRONIC DEVICE HAVING A STRESS RELEASING STRUCTURE AND METHOD FOR RELEASING STRESS IMPOSED THERETO

BACKGROUND OF THE INVENTION

1. Field of the Invention

The present invention relates to a handheld electronic device having a thin housing body. More particularly, the present invention relates to a handheld electronic device, such as a handheld (or laptop) computer or a mobile communication terminal, having a stress releasing structure and to a method for releasing stress imposed on such electronic devices.

As used herein, the term "handheld" is intended to be synonymous with "laptop." Thus, the term "handheld device" would include a "laptop device," and the term "handheld computer" would encompass a "laptop computer," for example.

2. Discussion of the Background

Recently, handheld electronic equipment, such as handheld computers and mobile communication terminals, has been developed having multiple functions and a compact size. Further, keyboard panels have been made with a very thin structure in order to enhance the compact sizing of handheld electronic equipment.

Generally, such handheld electronic equipment is includes a flat housing body, a keyboard device provided in a keyboard mounting opening in the housing body, and a circuit board provided in the housing body. The circuit board faces the keyboard device.

The keyboard device for a handheld computer is constructed by providing a plurality of keycaps and a pointing device on the front face of a keyboard panel. Usually, the bottom surface of the keyboard panel is covered with a metal shielding plate for reducing or preventing switching noises from the key devices. When the keys are depressed or when the pointing device is pushed, the stress imposed upon the keycaps or pointing device is received by the combined structure of the keyboard panel and the covered shield plate.

The circuit board is installed in the housing body with mounting circuit elements, such as a semiconductor package. The mounting circuit elements are very densely arranged.

Generally, it is advantageous for compact handheld electronic equipment to utilize a ball grid array (BGA) type semiconductor package. There are other types of semiconductor packages, such as a quad flat package (QFP). However, it is problematic to utilize a QFP in thin and small-sized equipment because the package size of a QFP increases as the number of input-output pins increases.

On the contrary, since the connecting terminals for the BGA semiconductor package are constructed by a plurality of solder balls that are positioned in a matrix structure on the backside surface of the package body, it is possible to increase the number of the input-output pins without increasing the size of the package. Consequently, the BGA semiconductor package is usually used for thin and small-sized handheld electronic devices.

Recently, there has been demand for thinner housing bodies for handheld electronic equipment. As thinner housing bodies have been developed, the mounting space between the keyboard panel and the circuit board in slim handheld computers has narrowed. For example, the gap between the BGA semiconductor package provided on the circuit board and the keyboard panel in a B5 sized handheld computer is typically less than 1 millimeter (mm). At the same time, the circuit element of the BGA semiconductor package is provided closer to the keyboard panel. Further, the keyboard panel itself is formed by a very thin plate so that the housing body can be made thin. Consequently, the keyboard panel as well as the housing body is becoming weaker and less rigid.

As the number of input-output pins increases in a BGA semiconductor package, the diameter of the solder ball for the BGA semiconductor package becomes smaller so that many pins can be densely arranged. For example, in a handheld computer having a thin housing body, the diameter of the solder ball is only several millimeters. Consequently, the contact surface between the solder ball and the circuit board becomes very small, and the binding force between them also becomes very weak.

In this situation, when a stress is imposed to the keycaps during an input operation to the handheld computer, the keyboard panel elastically deflects (i.e., bends) toward the circuit board because of the low rigidity of the keyboard panel. The bending of the keyboard panel may cause the keyboard panel to contact the BGA semiconductor package mounted on the circuit board. Thus, the stress imposed to the keycaps is directly transferred to the semiconductor package without any attenuation. This may cause cracks to develop at a soldering portion of the solder ball. Consequently, the reliability of the electric connections for the BGA semiconductor package is reduced because of the possibility of disconnected or severed wires caused by the cracks.

Many handheld computers use a pointing device for inputting coordinate positioning information. The pointing device includes a pointing stick and a plurality of distortion sensors provided around the pointing stick on a board. The pointing stick is placed among the keycaps and passes through the keyboard panel. A cylindrical elastic cap is attached to the top of the pointing stick. When the pointing stick is pressed and stressed (e.g., stressed perpendicular to its axis direction), a distortion is detected by one or more of the sensors provided around the pointing stick on the board. As a result of the detection, the inputted directional information moves a pointer on the screen in a desired direction and/or to a desired position.

In a handheld computer having a thin housing body, the use of the pointing device may cause the keyboard panel to bend or deflect downward under the stress imposed to the pointing stick if the keyboard panel is not rigid enough to resist the force applied to the pointing device, as with the operation of the keys. The deflection of the keyboard panel is detected by the sensors, causing the sensors make false detections. Consequently, the inputted directional information does not coincide with the movement of the pointer on the screen. In addition to making the input of directional information more difficult, a user may believe that the pointing stick is malfunctioning.

SUMMARY OF THE INVENTION

Accordingly, it is one object of the present invention to solve the aforementioned problems and defects of handheld electronic equipment having a thin housing body with a relatively low rigidity against load stress.

Another object of the present invention is to provide a novel structure and method for strengthening the reliability of electrical connections for a semiconductor package provided in the thin housing body of electronic equipment against imposed load stress.

A further object of the present invention is to provide a novel structure and method for improving the operability of a keyboard provided in the thin housing body of an electronic device.

A still further object of the present invention is to provide a novel structure and method for mounting a stress releasing spacer in a handheld computer while maintaining a predetermined distance between the keyboard and the thin housing body.

It is yet another object of the present invention to provide a novel handheld computer having a thin housing body and a pointing device that can be operated to accurately input coordinate information.

These and other objects are achieved according to the present invention by providing a a handheld electronic device that includes a thin housing body defining an opening and a keyboard panel provided in the opening of the thin housing body. The keyboard panel has a relatively low rigidity against stress. Further, the device includes a circuit board provided under the keyboard panel in the thin housing body and at least one circuit element mounted on the circuit board a predetermined distance from a surface of the keyboard. A spacing structure provided on the circuit board has a height greater than the circuit element to maintain the predetermined distance and release the stress imposed to the keyboard panel.

Preferably, at least one circuit element in the handheld electronic device is a Ball Grid Array (BGA) type semiconductor package which includes an integrated circuit (IC) chip. The circuit board and the IC chip are electrically connected through a plurality of solder balls provided in a matrix position. The spacing structure advantageously releases stress imposed upon the keyboard to prevent the keyboard panel from elastically deflecting into the space defined by the predetermined distance.

The semiconductor package may include a wiring board for mounting the IC chip as well as a cover plate fixed on the wiring board. The cover plate faces the surface of the keyboard panel and covers the IC chip.

The handheld electronic device according to the present invention may have at least one circuit element constructed in a flat, square shape. The spacing structure may include a plurality of frame members provided along one or more of the four edges of the square circuit element.

Preferably, the plurality of frame members for the spacing structure make at least one right angle comer portion of the spacing structure and are positioned along one of the comers of the square circuit element.

The keyboard panel may include a plurality of keys having respective keycaps, a plurality of switching elements corresponding to each of the keycaps. At least one right angle comer made of the frame members for the spacing structure is positioned under a center position of one of the switching elements and further includes a groove facing the surface of the keyboard panel.

In another embodiment, the handheld electronic device may include a thin housing body that has a palm rest portion and an opening portion, a keyboard panel provided in the opening portion of the thin housing body, a circuit board provided under the palm rest portion of the thin housing body, at least one circuit element mounted on the circuit board and a predetermined distance from the surface of the palm rest, and a spacing structure provided between an inner surface of the palm rest portion and the circuit board to maintain a predetermined distance between the surface of the palm rest portion and and the circuit element even when the palm rest portion receives load stress.

Preferably, the at least one circuit element is made of a BGA type semiconductor package which includes a package housing body having an IC chip, and the circuit board and the IC chip are electrically connected through a plurality of solder balls arranged in a matrix. The spacing structure releases the stress for preventing the palm rest portion from deflecting into the predetermined distance.

The handheld electronic device may include a spacer provided between the BGA type semiconductor package and a load stress receiving portion of the thin housing body.

In another embodiment, a handheld electronic device includes a thin housing body having a portion of relatively low rigidity, a circuit board under the portion of relatively low rigidity, at least one circuit element mounted on the circuit board and kept a predetermined distance from a surface of the portion of relatively low rigidity, and a spacing structure provided between the circuit board and the portion of relatively low rigidity to maintain a predetermined distance between the circuit board and the surface of the portion of relatively low rigidity, even when the portion receives a load stress.

In a further embodiment, a handheld computer includes a thin housing body having an opening portion, and a keyboard panel having a relatively low rigidity against load stress in the opening portion of the thin housing body. The keyboard panel has a plurality of keys for inputting information and a pointing device for inputting coordinate information in response to receiving a stress. The handheld computer also includes a circuit board provided under the keyboard panel in the thin housing body, at least one circuit element mounted on the circuit board and kept a predetermined distance from a surface of the keyboard, a first space pad provided under the pointing device so as to maintain the predetermined distance between the circuit board and the pointing device, and a second space pad provided between the circuit board and a surface of the thin housing body in a corresponding position under the first space pad.

In one embodiment, a back surface of the keyboard panel of a handheld computer is covered with a shield plate, and the pointing device includes a fixing board supported on the back surface of the keyboard panel through the shield plate. The pointing device also includes a pointing stick fixed on the fixing board and extending upward through the shield plate and the keyboard panel. The first space pad is formed by an elastic sheet member corresponding to the fixing board for the pointing device, and the second space pad is made by providing a boss portion on a bottom surface of the thin housing body.

Preferably, the boss portion of the second space pad is made of a pair of crossing rib members provided on the bottom surface of the thin housing body. An edge of the boss portion of the second space pad may contact the circuit board.

The second space pad may be a projection formed on the bottom surface of the thin housing body at a position for supporting the pointing device.

The second space pad may also have a guiding portion provided on the bottom surface of the thin housing body, and the first space pad may have a connecting groove configured to fit the guiding portion of the second space pad.

The circuit board of the handheld computer may have an aperture at a position corresponding to the pointing device, and the pair of crossing ribs of the second space pad may project through the aperture of the circuit board to directly support the pointing device.

According to the inventive method for providing a load stress releasing structure for a handheld electronic device having a keyboard panel provided in a thin housing body, a keyboard panel is provided in an opening portion of the thin housing body. A circuit board is provided under the keyboard panel in the thin housing body, and a semiconductor package is mounted on the circuit board such that a predetermined distance between the semiconductor package and the keyboard panel is kept. A spacer is provided near the semiconductor package to maintain the predetermined distance even when the keyboard panel receives a load stress that exceeds the rigidity of the keyboard panel.

BRIEF DESCRIPTION OF THE DRAWINGS

A more complete appreciation of the present invention and its many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
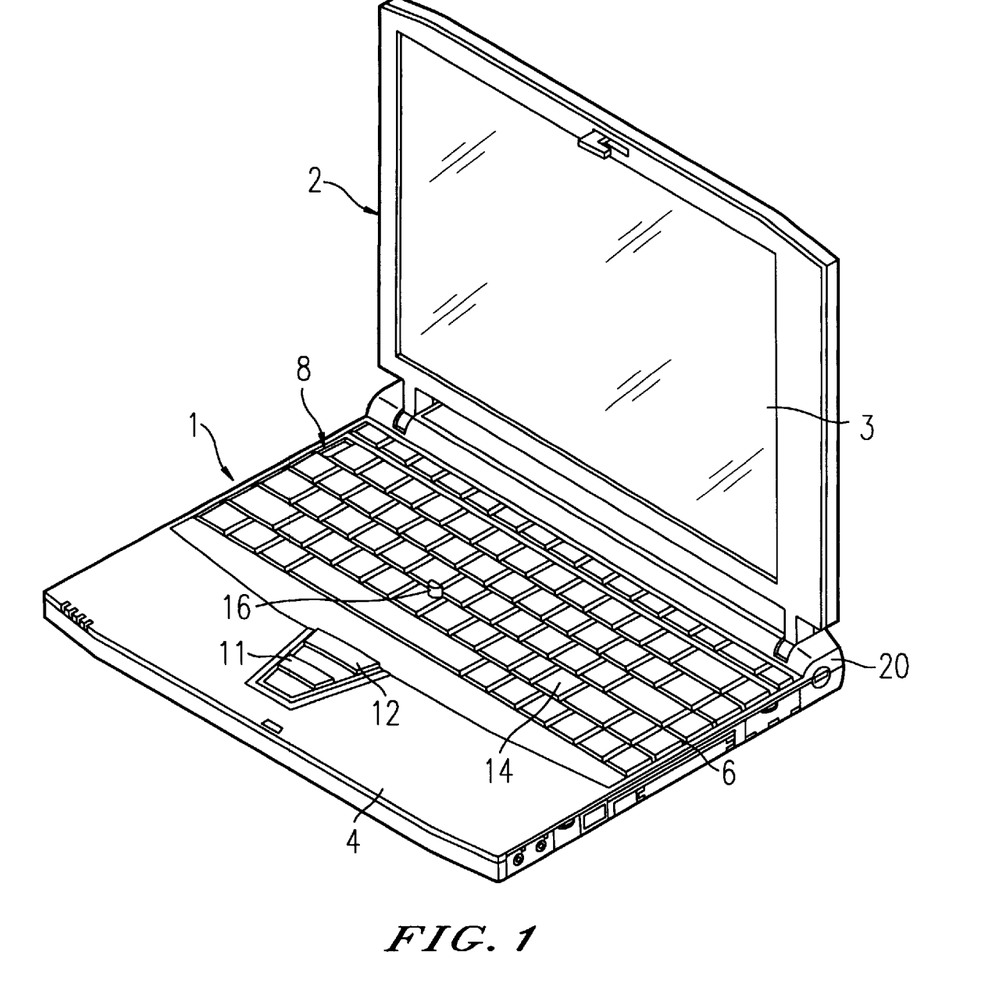
FIG. 1 is a perspective view of a handheld computer of a preferred embodiment of the present invention.

Referring now to the drawings, wherein like reference numerals designate identical or corresponding parts throughout the several views, and more particularly to FIG. 1 thereof, a handheld computer having a thin housing body is shown. The thin housing body includes a main body 1 and a rotatable display unit 2 that is attached to the main body I so as to cover the main body 1 when the computer is closed. The main body 1 is made of, for example, a magnesium alloy and has a palm rest portion 4 and an opening 6 for attaching a keyboard 8.

Figure 2:
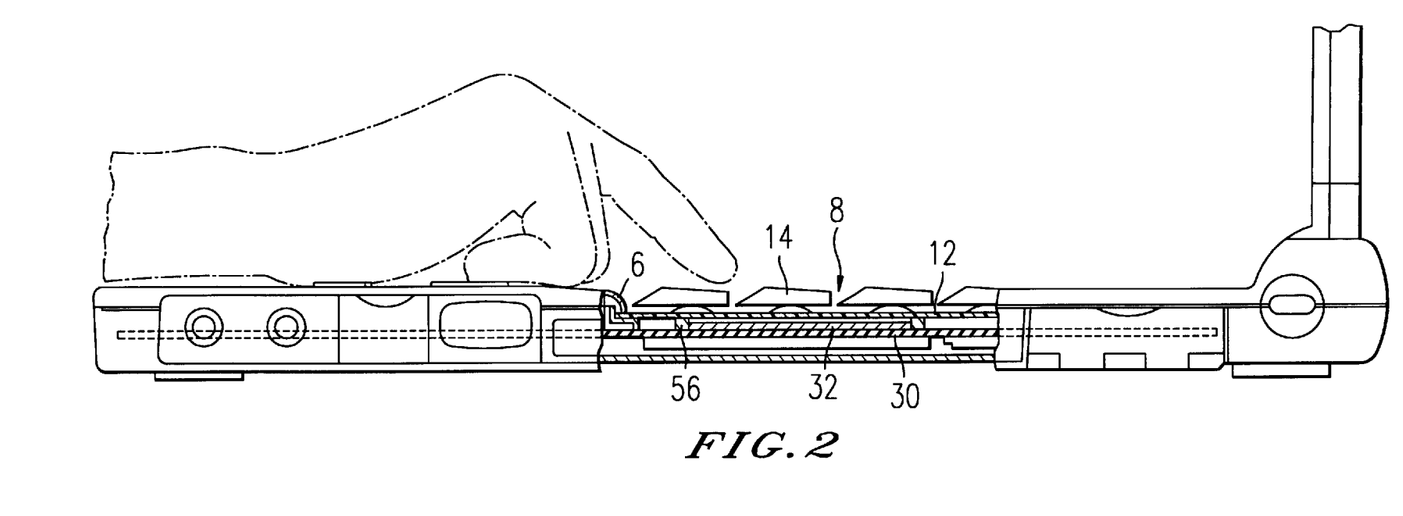
FIG. 2 is a side view of the handheld computer of FIG. 1 with the thin housing body partially cut away.

The key board includes a plurality of keys provided on a keyboard panel 12 (FIG. 2). In the middle of the keys, a pointing device 16 is provided. The pointing device 16 projects through an aperture of the keyboard panel 12 (FIG. 2). At the center of the palm rest portion 4, a pair of click switch buttons 11, 12 are provided.

Along one elongate edge of the body 1, a mounting portion 10 is provided for attaching the rotatable display unit 2. The display unit 2 includes a display device 3, e.g., a liquid crystal display and a housing for the display screen 3. The display housing is comprised of a magnesium alloy cover and a synthetic resin mask.

Figure 3:
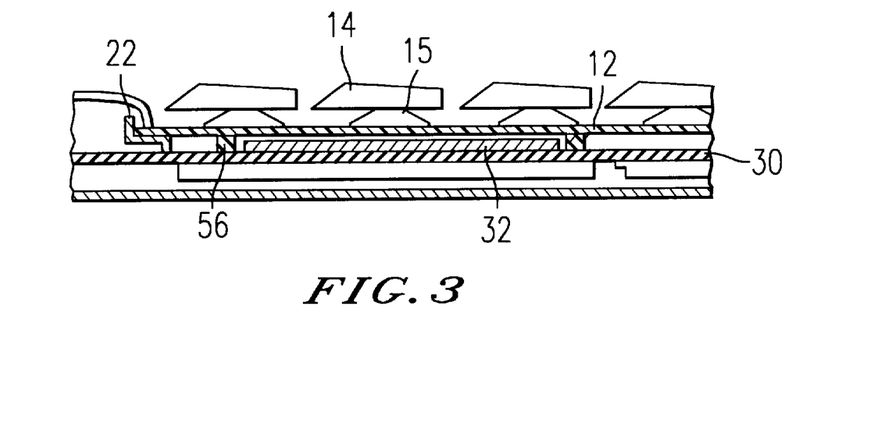
FIG. 3 is an enlarged cross-sectional view of FIG. 2.

As shown in FIGS. 2 and 3, a circuit module, e.g., a CPU module 32 is mounted on a circuit board 30 parallel to a bottom face of the main body 1.

As shown in FIG. 3, the plurality of keys 14 are supported on a synthetic resin keyboard panel 12 through a respective climbing spring structure 15. The keyboard panel 12 is fixed to a peripheral supporting member 22 provided in the opening 8 of the housing body 2.

In order to reduce the thickness of the housing body 2, the thickness of the keyboard panel 12 is reduced as much as possible. The rigidity of the panel 12 itself is also reduced.

Figure 5A:
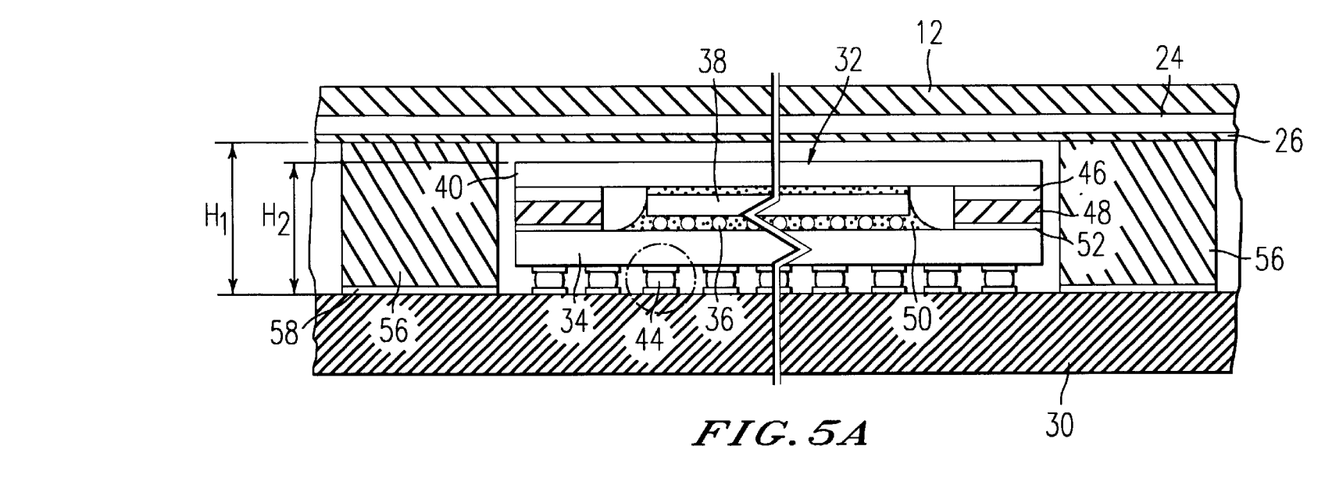
FIG. 5A is an enlarged cross-sectional view of the semiconductor package and the stress releasing space pad.

As shown in FIG. 5A, the backside of the keyboard panel 12 is covered with a metal shield plate 24 for preventing the switching noises of the keys from escaping the housing body 2. The shield plate 24 also enhances the rigidity of the keyboard panel 12. A soft insulating sheet 26 covers the shield plate 24.

Figure 6:
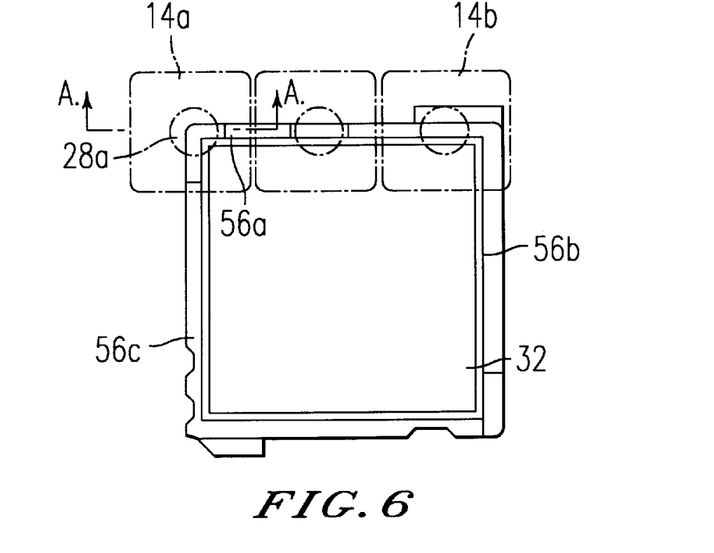
FIG. 6 is a top view of the keycaps in FIG. 4 for showing the positionally relationship between the space pad and the keycaps.
Figure 7:
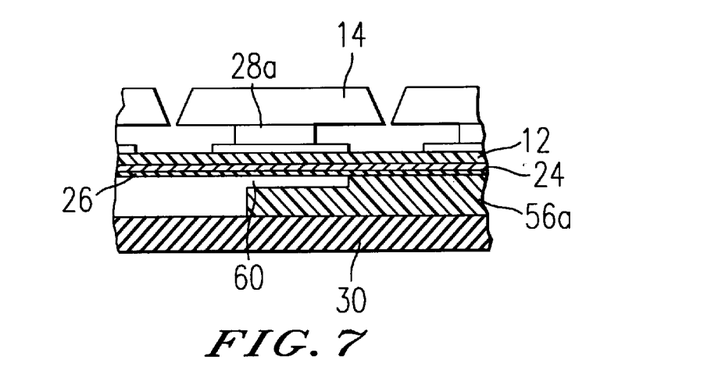
FIG. 7 is a cross-sectional view along the line A—A shown in FIG. 6.

As shown in FIGS. 6 and 7, a plurality of cylindrical switching members, such as switching member 28a, are provided in a matrix on the keyboard panel 12. Each of the switching members corresponds to the top portion or keycap of one of the keys. As shown in FIG. 7, the switching element 28a corresponds to the keycap 14. The switching members form cylinders having a smaller diameter than the respective keycaps. By pressing the keycap 14a, the switching member 28a performs an ON/OFF operation. Thus, the keyboard panel 12 receives a load stress during the key input operation.

As shown in FIG. 2, a circuit board 30 is screwed to the keyboard 12 in parallel to a bottom surface of the housing body. On the circuit board 30, circuit elements 32, such as BGA type semiconductor packages or connectors, are densely mounted.

As shown in FIGS. 2 or 3, the BGA type semiconductor package 32 may be provided on an underside surface of the keyboard panel 12.

As illustrated in FIG. 5A the BGA type semiconductor package 32 includes a wiring board 34, a flip chip bonded IC chip 38 bonded on the wiring board 34 through a plurality of solder balls 36, and a cover plate 40 over the IC chip 38. The wiring board 34 is substantially square shaped. On an underside surface of the wiring board 34 opposite the IC chip 28, the wiring board 34 is provided with a plurality of land portions 42.

Figure 5B:
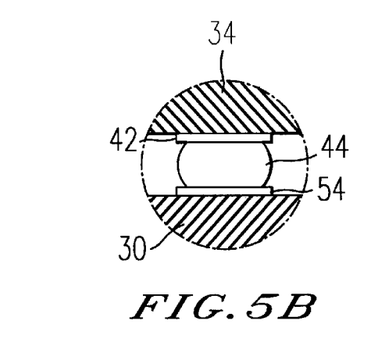
FIG. 5B is an enlarged view of the circled portion of the semiconductor package in FIG. 5A.

As shown in FIG. 5B, the respective land portions 42 are connected to each of the solder balls 44. The solder balls 44 are arranged in a matrix with a predetermined pitch. The solder balls 44 are electrically coupled to the IC chip 38 through a signal wiring layer on the wiring board 34.

Figure 4:
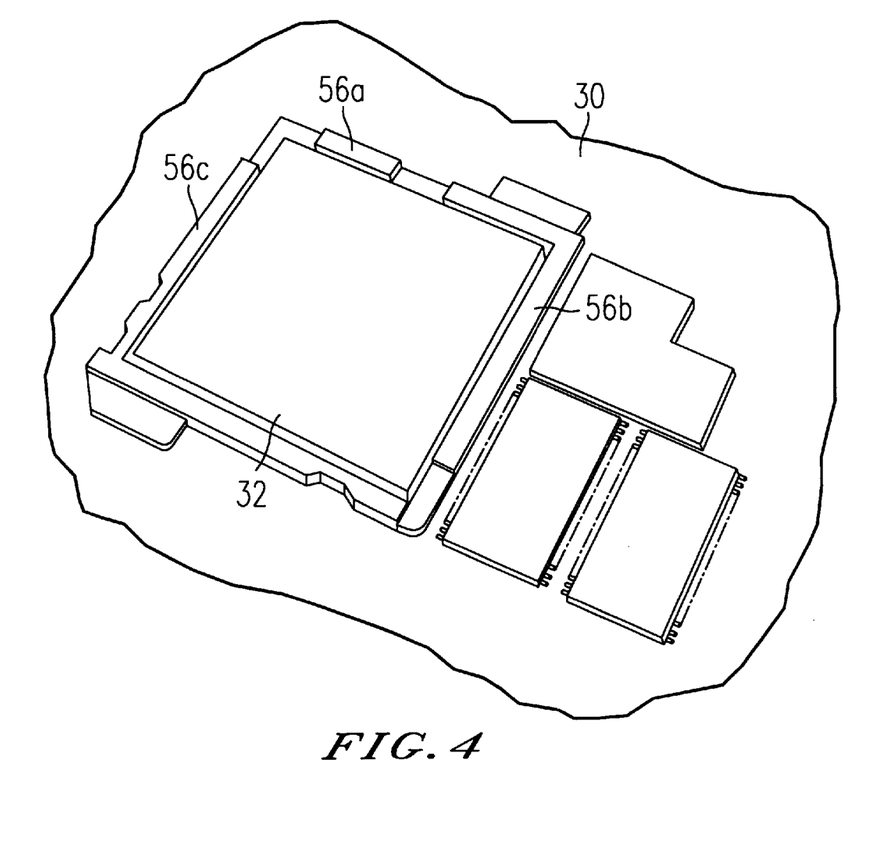
FIG. 4 is a perspective view of the circuit board showing the relationship between the semiconductor package and the stress releasing space pad.

As shown in FIGS. 4 and 6, the cover plate 32 has a square shape similar to the wiring board 34 and faces the IC chip 38. The peripheral edge portion of the cover plate 32 is bonded to a supporting frame 48 with a first adhesive material 46. The supporting frame 48 surrounds the IC chip 38, the wiring board 34, and the soldering portion 50. Further, the supporting frame 48 is fixed on the wiring board 34 with a second adhesive material 52. The first and second adhesive materials 46, 52 may be formed from the same substance.

As shown in FIGS. 5A and 5B, a plurality of connection pads 54 are provided on the circuit board 30. Each connection pad corresponds to a respective solder ball 44 attached to the semiconductor package 32. Each connection pad 54 is soldered to the corresponding solder ball 44 to electrically connect the semiconductor package 32 and the circuit board 30.

In the event that the semiconductor package 32 is soldered to the circuit board 30, the upper surface of the cover plate 40 faces the insulator layer 26 provided on the shield plate 24. Surrounding the semiconductor package 32 is a synthetic resin spacer 56 fixed on the circuit board 30 through an adhesive 58 for maintaining a predetermined clearance, e.g., about 0.5 mm, between the upper face of the cover plate 40 and the insulator layer 26.

As shown in FIG. 4, the spacer 56 is includes a plurality of pad frames 56a, 56b, 56c for surrounding the semiconductor package 32 on the circuit board 30. Thus, the space pad frames 56a, 56b, 56c form a plurality of reinforcing corners against one or more of the rectangular corners of the semiconductor package 32.

As shown in FIG. 5A, the height H1 of the space pad 56 is larger than the height H2 of the semiconductor package 32 to maintain the predetermined clearance between the upper surface of the cover plate 40 and the insulator layer 26. The upper surface of the space pad 56 supports the keyboard panel 12 by contacting the shield plate 24 through the insulator 26. Thus, the height of the space pad 56 defines the space or clearance between the upper surface of the circuit board 30 and the shield plate 26 along the edge of the package body 32.

As shown in FIG. 6, the lateral frames 56a and 56b of the space pad 56 extend along the lateral arrangement of the keycaps 14 below the switching member 28. A corner portion made by the spacer frames is positioned directly below a switching member 14b. At a particular position corresponding to a particular switching member, the longitudinal frame 56c of the spacer does not traverse wholly the width of the keycap 14a but ends at the corresponding position to the switching member 28a.

As shown in FIG. 7, the upper surface of the spacer 56a forms a groove portion 60 in a direction away from the shield plate 26. At the corresponding position to the groove portion 60, the spacer 56 does not contact the shield plate 26, for reasons explained below.

When a spacer 56 exists between the keyboard panel 12 and the semiconductor package 32, a switching member 28 corresponding to a particular keycap 14 becomes in a cantilever state. Such a cantilever state causes an abnormal action of the switching member 28 and also causes an abnormal feeling to the user when the keycap 14 is pressed down.

According to the preferred embodiment, the switching member 28 can be equally pushed down without any inclination because each of the first and the third corners of the spacer 56 has a groove portion 60. Consequently, a smooth key input operation can achieved by preventing the abnormal action of the switching member in spite of the fact that the keyboard panel is supported by the spacer 56 from underneath.

According to the invention, the stress imposed upon the keyboard during the key operation is received and released by the space pad. This prevents a keyboard panel of relatively low rigidity from being elastically deflected, displaced, or bent toward the cover plate of the semiconductor package. Consequently, the clearance between the cover plate of the semiconductor package and the shield plate below the keyboard panel can be maintained.

Accordingly, the imposed stress is prevented from directly affecting the solder balls on the circuit board and causing cracks or disconnections at the solder connecting portion. Consequently, the reliability of the electric connections in the device can be improved.

Figure 8:
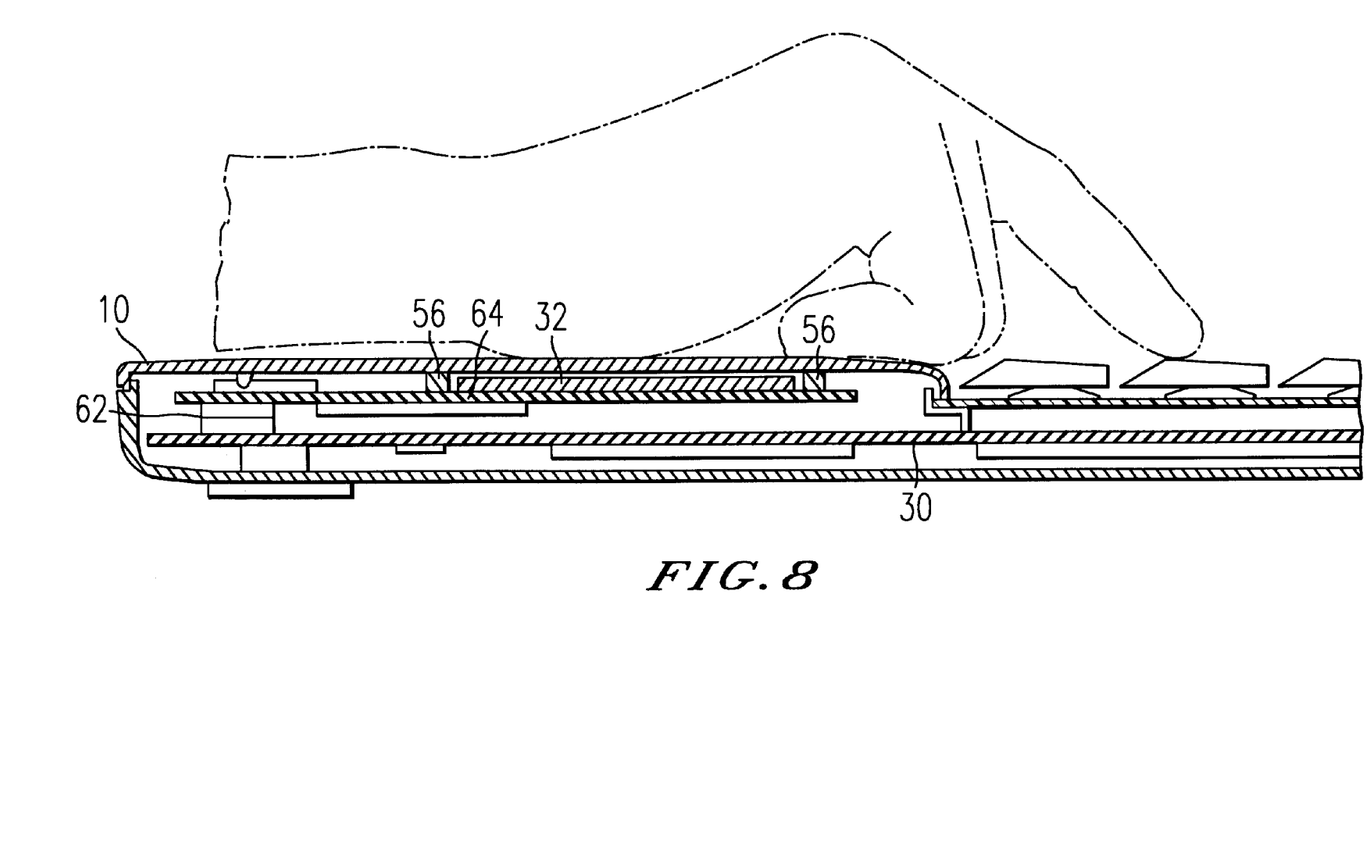
FIG. 8 is a cross-sectional view of a handheld computer, according to a second embodiment of the invention, with the palm rest portion of the thin housing body partially cut away.

FIG. 8 shows a second embodiment according to the present invention. In this embodiment, the semiconductor package 32 is mounted under a palm rest portion 10 in the housing body. With the second embodiment, an auxiliary circuit board 64 is connected to the circuit board 30 through a stacking connector 62. The auxiliary circuit board 64 is provided below the palm rest portion 10 of the housing body in parallel to the circuit board 30. A BGA type semiconductor package 32 is soldered on a mounting surface of the auxiliary circuit board 64. The mounting surface of the auxiliary circuit board 64 faces an undersurface of the palm rest 10. The space or clearance between a cover plate for the semiconductor package 32 and the undersurface of the palm rest is narrow, e.g., about 0.5 mm.

A space pad 56 is adhered on the auxiliary circuit board 64 and surrounds the semiconductor package 32. An upper surface of the space pad 56 contacts the undersurface of the palm rest portion 10. Consequently, the clearance between the auxiliary circuit board 64 and the undersurface of the palm rest portion 10 is maintained by the space pad 10 even when a stress is imposed on the palm rest portion 10. Consequently, the semiconductor package 32 is prevented from breaking or being damaged due to the elastic deflection of the thin palm rest portion 10 when a stress is imposed on the palm rest portion 10, i.e., when the thin palm rest portion bends inward.

Figure 9:
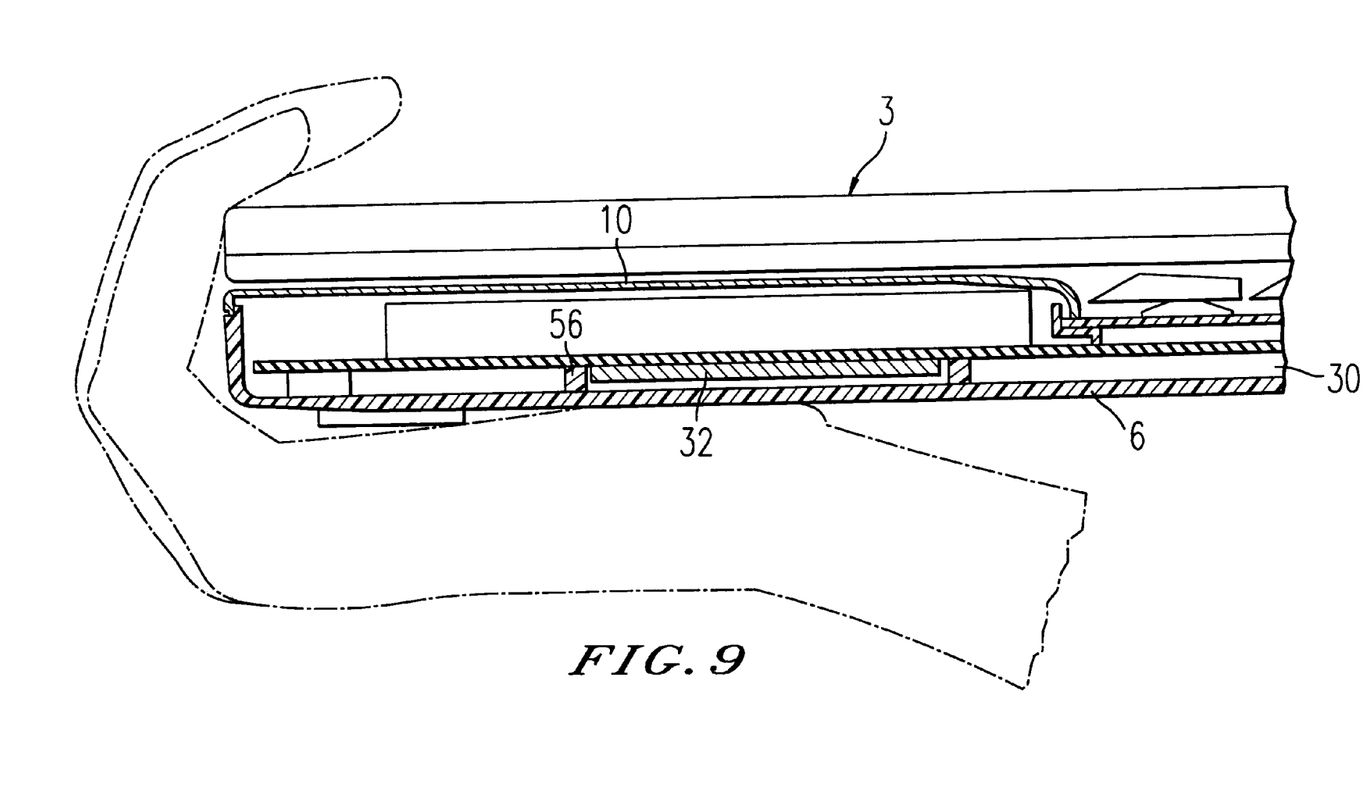
FIG. 9 is a cross-sectional view of a handheld computer. According to a third embodiment of the present invention, with a portion of the palm rest portion of the thin housing body cut away.

FIG. 9 shows a third embodiment of the present invention. In this embodiment, the location of the BGA type semiconductor package 32 is different from the first and the second embodiments. Thus, the BGA type semiconductor package 32 is soldered on an undersurface of the circuit board 30, and the cover plate of the package 32 faces against a bottom surface of the housing body. The space or clearance between the cover plate of the package 32 and the bottom surface of the housing body is narrow, e.g., about 0.5 mm.

On an undersurface of the circuit board 30, a space pad 56 is adhered to the circuit board and surrounds the semiconductor package 32. A lower surface of the space pad 56 contacts the bottom surface of the housing body to maintain the clearance between the circuit board 30 and the housing body.

When the rigidity of the housing body is reduced to make the housing body thin, the synthetic resin bottom surface of the housing body may be elastically deflected, i.e., bent or depressed inward, under stress applied from a user's hands. With the third embodiment, the hand stress is received and released by the space pad 56, as shown in FIG. 9.

Consequently, the bottom surface of the housing body is prevented from deflecting toward the package 32 on the circuit board 30.

Figure 10:
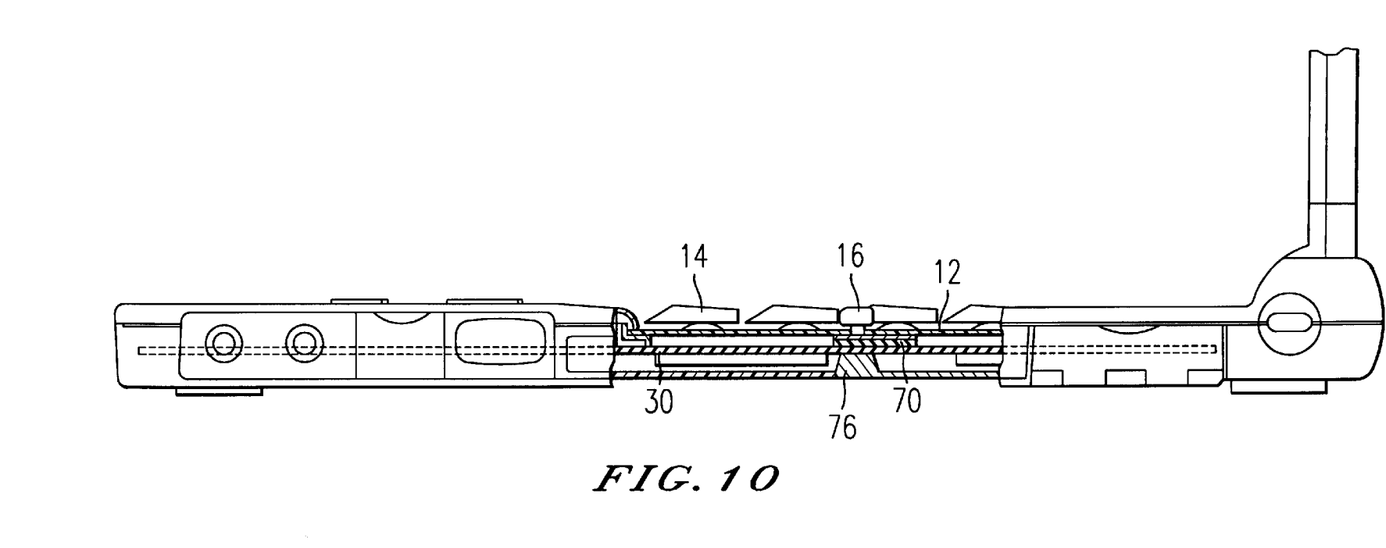
FIG. 10 is a side view of the handheld computer of FIG. 1 with the thin housing body partially cut away to expose the pointing stick.
Figure 11A:
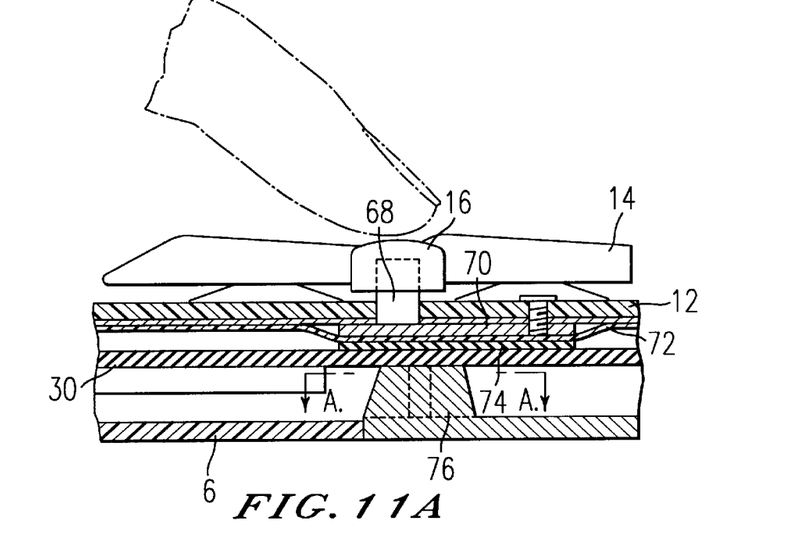
FIG. 11A is an enlarged cross-sectional view of the pointing device shown in FIG. 10.
Figure 11B:
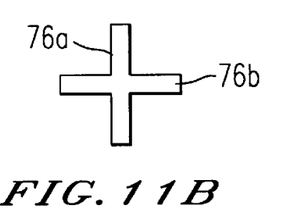
FIG. 11B is a cross-sectional view of the pointing spacer along the line A—A in FIG. 11A.
Figure 12:
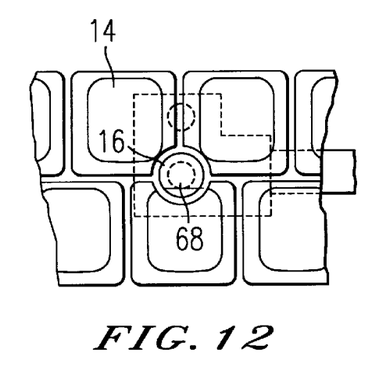
FIG. 12 is a top view showing the relationship between the pointing spacer and the pointing device.

FIGS. 10 and 11 set forth a fourth embodiment of the present invention. As explained in FIG. 1, for a handheld computer, a pointing device is provided at a center portion of a keyboard. The pointing device includes a flat base plate, an operational stick portion attached on the base plate, and a cap for covering the top of the stick portion. When the cap is pressed in a direction perpendicular to the axis of the stick portion, the stick portion produces a distortion. The produced distortion is detected by a plurality of sensors provided around the stick on the base plate for moving a pointer on the screen of the computer, as discussed above.

FIG. 10 shows how the thin housing body can be enforced, thereby improving the operability of the pointing stick. As explained above, for enhancing the thickness of the housing body, the keyboard panel is made from a thin board which may be similar to the shield plate covering the keyboard panel. Consequently, the rigidity of the keyboard panel is also reduced. The low rigidity of the keyboard influences the operability of the pointing device 16.

Thus, when the pointing stick 70 is stressed, the synthetic resin keyboard panel 12 bends and is deflected into the housing body. The depression of the keyboard panel 12 causes the distortion sensors provided around the pointing stick 70 to function erroneously. Consequently, the sensors cause the pointer on the screen to appear to function erroneously. Thus, the movement of the pointer does not coincide with the direction input to the pointing stick 12. As a result, the operability of the pointing device deteriorates. Accordingly, the present invention provides a stress releasing structure for maintaining a sufficient operability of the pointing device.

As shown in FIG. 11A, the fourth embodiment includes a fixing board 70 for fixing the pointing stick 68. The fixing board 70 is attached to the keyboard panel 12 with screws. The fixing board 70 is covered with a shield plate and an insulator. The fixing board 70 is electrically connected to the circuit board 30 through a flexible wiring board. Four sensors are provided around the pointing stick 68 for detecting the distortion of the stick.

An upper edge portion of the pointing stick 68 projects among a plurality of keycaps 14 and passes through the shield plate 72 and the keyboard panel 12 from the fixing board 70. A rubber cap 16 is attached to the upper edge portion of the pointing stick 68 for easiness of the action.

As explained before, the pointing stick 68 is manually stressed by pressing the cap 16, a distortion is produced. This distortion is detected by the sensors provided on the fixing board 70. Based on the distortion detected, instructions are generated for moving the pointer on a screen in the direction corresponding to the distortion detected.

According to the present invention, a first spacing pad sheet 74 is provided between the circuit board 30 and the shield plate 72. Preferably, the first spacing pad sheet 74 is made of an elastic body, such as a rubber, and is adhered to the circuit board 30. The first spacing pad sheet 74 has a predetermined thickness and is shaped to correspond to the shape of the shield plate 72.

Further, according to the present invention, a second spacing pad is provided on a bottom surface of the housing body. In a preferred embodiment, the second spacing pad is a projecting boss portion 76 provided on the bottom surface of the housing. The boss portion 76 may be part of the body.

As shown in FIG. 11B, the boss portion 76 is formed of a pair of crossing rib members 76a and 76b. The boss portion 76 is placed just under the pointing device 16, and the upper edges of the rib members contact the circuit board 30. Thus, the boss portion 76 is provided between the metal housing body and the circuit board 30 for supporting the circuit board 30.

In a thin housing body handheld computer having the spacing pads described above, the stress imposed on the cap portion 16 of the pointing stick 68 is released to the metal bottom surface of the housing body through the first spacing sheet pad 74 and the second spacing boss 76.

Consequently, the pointing stick 68 is firmly supported by the spacing pads during a coordinate positioning operation. Further, the keyboard panel 12 is firmly supported by the spacing pads and is prevented from being depressed downward. As a consequence, the sensors are prevented from detecting error distortions caused by the deflection of the keyboard panel. Thus, the reliability of the coordinate positioning operation is improved.

Further, since the circuit board 30 is also firmly supported by the spacing sheet pad 74 and the boss portion 76 without bending under the imposed stress on the pointing stick 68, the wiring layer provided on the circuit board 30 is prevented from disconnecting, and the soldered portions of the circuit elements are prevented from being damaged by stress. Thus, the reliability of the electrical connections of the circuit elements can be increased.

Further, since the spacing sheet pad is made of a rubber-like elastic body, a frictional force is produced at contacting surfaces between the spacing sheet pad and the insulator covering the shield plate. The friction power prevents the insulator or the keyboard from sliding when a stress, such as manual stress, is imposed on the pointing stick. Since the pointing space pad is firmly contacted to the insulator the pointing device is firmly fixed to the keyboard panel.

Figure 13:
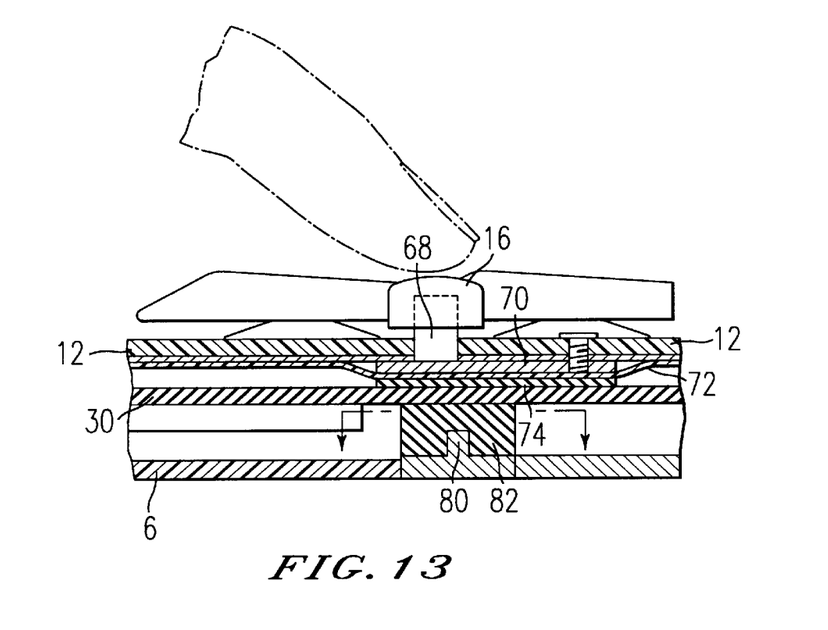
FIG. 13 is a cross-sectional view of another embodiment of the pointing spacer.

FIG. 13 shows a fifth embodiment of the spacing structure according to the present invention. In this embodiment, the structure of the second spacer for supporting the circuit board 30 is different from the second spacer in the fourth embodiment.

In this embodiment, a convex portion 80 for guiding the space pad is formed on the bottom surface of the housing body. The convex portion 80 may be formed in one piece with the housing body. A second spacing pad 82 has a concave portion for engaging the convex portion 80. Thus, the position of the second spacing pad 82 is determined by the position of the convex portion 80 so as to support the pointing device. The second spacing pad is made of an elastic member.

As with the fourth embodiment of the present invention, the stress imposed to the pointing stick is released to the bottom surface of the housing body because the first spacing sheet pad and the second spacing pad are provided between the pointing device fixing board and the housing body. Thus, the operability of the pointing device is improved.

Figure 14:
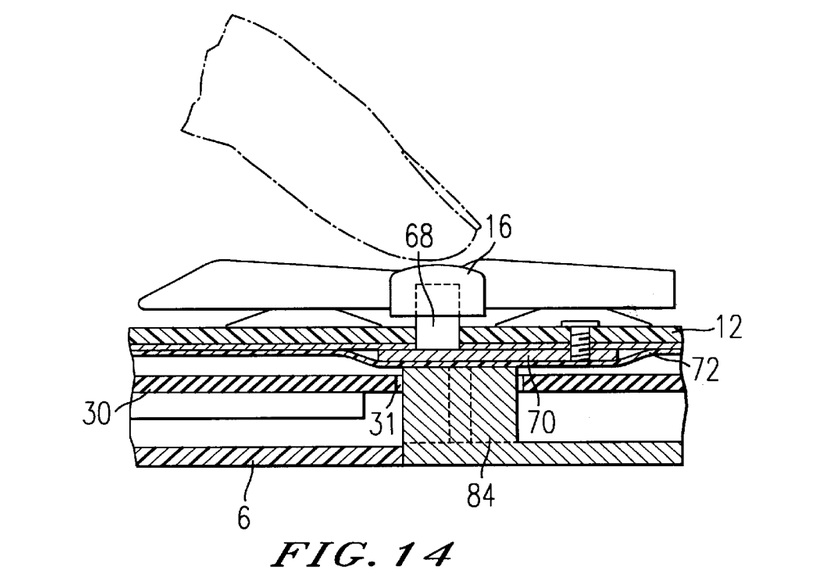
FIG. 14 is a cross-sectional view of yet another embodiment of the pointing spacer.

FIG. 14 illustrates a sixth embodiment of the present invention. The supporting structure of the pointing device is different from the fourth and fifth embodiments. In the sixth embodiment, the circuit board 30 has an aperture 31 just under the pointing device.

A convex portion 84 is formed on the bottom surface of the housing body so as to pass through the aperture 31 of the circuit board 30. As with FIG. 11B, the convex portion 84 is made of a pair of crossing rib members. The upper edge of the convex portion 84 directly contacts the insulator or shield plate 72 and passes through the aperture 31 of the circuit board 30. Thus, the convex portion 84 directly supports the pointing device fixing board 70 through the insulator or shield plate 72.

Since the pointing device fixing board 70 is fixed to the keyboard panel 12 with screws, the stress imposed on the pointing stick is released to the bottom surface of the housing body through the convex portion 84. Consequently, the operability of the pointing stick 68 is stabilized.

As explained above, the inventive structure can receive and release the imposed stress without damaging or breaking the semiconductor package. Further, it is possible to stabilize the pointing device. Thus, the present invention provides a thin housing body handheld computer with improved operability.

In the embodiments described above, the housing body is explained as a magnesium alloy body. However, it is also possible to make the housing body by a synthetic resin.

Obviously, numerous modifications and variations of the present invention are possible in light of the above teachings. It is therefore to be understood that, within the scope of the appended claims, the invention may be practiced otherwise than as specifically described herein.

This application is based on Japanese Patent Applications P 10-135142, filed May 18, 1998, and P10-135143, filed May 18, 1998. Japanese Patent Applications P10-135142 and P10-135143, and all references cited therein, are incorporated herein by reference.

We claim:

1. A handheld electronic device, comprising:

a thin housing body defining an opening;

a keyboard panel having low rigidity provided in the opening of the thin housing body;

a circuit board provided under the keyboard panel in the thin housing body;

at least one circuit element mounted on the circuit board a predetermined distance from the keyboard panel; and a spacing structure provided on the circuit board around the circuit element, the spacing structure being configured to release stress imposed on the keyboard panel and having a height larger than a height of the circuit element so as to maintain the predetermined distance between the circuit element and the keyboard panel.

2. The device of claim 1, wherein the circuit element comprises:

a Ball Grid Array semiconductor package including an IC chip, wherein the circuit board and the IC chip are electrically coupled through a plurality of solder balls arranged in a matrix, and wherein the spacing structure is configured to release stress imposed on the keyboard to prevent elastic deflection of the keyboard panel toward the circuit element to maintain the predetermined distance between the circuit element and the keyboard panel.

3. The device of claim 1, wherein the circuit element is flat and square, and the spacing structure comprises:

a plurality of frame members provided along at least one of the four sides of the circuit element.

4. The device of claim 1, wherein the circuit element comprises:

a Ball Grid Array semiconductor package; and wherein the device further comprises:

a spacer between the Ball Grid Array semiconductor package and a load stress receiving portion of the thin housing body.

5. The device of claim 2, wherein the semiconductor package comprises:

a wiring board on which the IC chip is mounted; and a cover plate covering the IC chip, said cover plate being fixed to the wiring board and facing a bottom surface of the keyboard panel.

6. The device of claim 2 wherein the circuit element is flat and square, and the spacing structure comprises:

a plurality of frame members provided along at least one of the four sides of the circuit element.

7. The device of claim 6, wherein the plurality of frame members form a right angle corner portion of the spacing structure around a corresponding corner of the circuit element.

8. The device of claim 6, wherein the keyboard panel comprises:

a plurality of keycaps; and a plurality of switching elements corresponding to the keycaps, wherein the right angle corner formed by the frame members is positioned under a center position of one of the switching elements and defines a groove facing the keyboard panel.

9. The device of claim 3, wherein the plurality of frame members form a right angle corner portion of the spacing structure around a corresponding corner of the circuit element.

10. The device of claim 3, wherein the keyboard panel comprises:

a plurality of keycaps; and a plurality of switching elements corresponding to the keycaps, wherein the right angle corner formed by the frame members is positioned under a center position of one of the switching elements and defines a groove facing the surface of the keyboard panel.

11. A handheld electronic device, comprising:

a thin housing body having a surface defining an opening, said surface including a palm rest portion;

a keyboard panel provided in the opening;

a circuit board provided under the palm rest portion;

at least one circuit element mounted on the circuit board a predetermined distance from the palm rest; and a spacing structure provided between an inner surface of the palm rest and the circuit board, the spacing structure being configured to surround the circuit element so as to maintain the predetermined distance between the circuit element and the palm rest when the palm rest receives a load stress.

12. The device of claim 11, wherein the circuit element comprises:

a Ball Grid Array semiconductor package including an IC chip, wherein the circuit board and the IC chip are electrically coupled through a plurality of solder balls arranged in a matrix, and wherein the spacing structure is configured to release stress imposed on the palm rest to prevent elastic deflection of the palm rest toward the circuit element to maintain the predetermined distance between the circuit element and the palm rest.

13. A handheld electronic device, comprising:

a thin housing body having a low rigidity portion;

a circuit board under the low rigidity portion;

at least one circuit element mounted on the circuit board a predetermined distance from the low rigidity portion; and a spacing structure provided between the circuit board and the low rigidity portion, said spacing structure being configured to surround the circuit element so as to maintain the predetermined distance between the circuit board and the low rigidity portion when the low rigidity portion receives a load stress.

14. A handheld computer, comprising:

a thin housing body defining an opening;

a keyboard panel having low rigidity provided in the opening, the keyboard panel including a plurality of keys configured to input information, and a pointing device configured to input coordinate information;

a circuit board provided under the keyboard panel;

at least one circuit element mounted on the circuit board a predetermined distance from the keyboard panel;

a first space pad under the pointing device and above the circuit board to maintain the predetermined distance between the circuit board and the pointing device; and a second space pad under the circuit board opposite the first space pad and above a bottom panel of the thin housing body.

15. The computer of claim 14, wherein the second space pad comprises:

a guiding portion on an inside surface of a bottom panel of the thin housing body; and wherein the first space pad defines a connecting groove adapted to fit to the guiding portion of the second space pad.

16. The computer of claim 14, wherein the keyboard panel comprises:

a back surface covered with a shield plate;

wherein the pointing device comprises:

a fixing board supported on the back surface of the keyboard panel through the shield plate; and a pointing stick fixed on the fixing board and extending upward through the shield plate and the keyboard panel;

wherein the first space pad comprises:

an elastic sheet member having a shape corresponding to the fixing board; and wherein the second space pad comprises:

a boss portion arranged on an inside surface of a bottom panel of the thin housing body.

17. The computer of claim 16, wherein the boss portion comprises:

a pair of crossing rib members provided on the top surface of the bottom panel of the thin housing body.

18. The computer of claim 17, wherein the circuit board defines an aperture below the pointing device, and the pair of crossing ribs extends through the aperture to support the pointing device.

19. The computer of claim 18, wherein an edge of the boss portion of the second space pad contacts the circuit board.

20. A handheld computer, comprising:

a thin housing body defining an opening;

a keyboard panel having low rigidity provided in the opening, the keyboard panel including a plurality of keys configured to input information, and a pointing device configured to input coordinate information;

a circuit board provided under the keyboard panel;

at least one circuit element mounted on the circuit board a predetermined distance from the keyboard panel;

a first space pad under the pointing device and above the circuit board to maintain the predetermined distance between the circuit board and the pointing device; and a second space pad under the circuit board opposite the first space pad and above a bottom panel of the thin housing body, wherein the second space pad comprises:

a projection formed on an inside surface of a bottom panel of the thin housing body, said projection being positioned to support the pointing device.

21. A method for releasing a load stress in an electronic device having a keyboard panel provided in a thin housing body, comprising:

positioning the keyboard panel in an opening defined by the thin housing body;

placing a circuit board in the thin housing body under the keyboard panel;

mounting a semiconductor package on the circuit board a predetermined distance from the keyboard panel; and surrounding the semiconductor package with a spacing structure to maintain the predetermined distance between the semiconductor package and the keyboard panel when the keyboard panel receives a load stress that causes an elastic deflection of the keyboard panel.

* * * * *